United States Patent
Li et al.

(10) Patent No.: US 11,938,704 B2
(45) Date of Patent: Mar. 26, 2024

(54) METHOD FOR PREPARING COMPOSITE MATERIAL CONTAINING ULTRA-WEAR-RESISTANT AND EASY-TO-CLEAN PVC PRE-COATING FILM

(71) Applicant: Banfert New Materials Co., Ltd., Changsha (CN)

(72) Inventors: XinXiong Li, Changsha (CN); He Nian Long, Changsha (CN); Hui Li, Changsha (CN); DongMing Zhang, Changsha (CN); Shizhen Li, Changsha (CN); XiuLin Deng, Changsha (CN)

(73) Assignee: Banfert New Materials Co., Ltd.

( * ) Notice: Subject to any disclaimer, the term of this patent is extended or adjusted under 35 U.S.C. 154(b) by 680 days.

(21) Appl. No.: 17/027,800

(22) Filed: Sep. 22, 2020

(65) Prior Publication Data

US 2021/0154986 A1     May 27, 2021

Related U.S. Application Data

(63) Continuation of application No. PCT/CN2019/120506, filed on Nov. 25, 2019.

(51) Int. Cl.
| | |
|---|---|
| *B32B 27/30* | (2006.01) |
| *B32B 37/10* | (2006.01) |
| *B32B 37/16* | (2006.01) |
| *C08J 5/12* | (2006.01) |
| *C08J 5/18* | (2006.01) |
| *E04F 15/10* | (2006.01) |

(52) U.S. Cl.
CPC ............ *B32B 27/304* (2013.01); *B32B 37/10* (2013.01); *C08J 5/121* (2013.01); *C08J 5/18* (2013.01); *E04F 15/105* (2013.01); *E04F 15/107* (2013.01); *B32B 37/16* (2013.01); *B32B 2255/26* (2013.01); *B32B 2307/584* (2013.01); *B32B 2327/06* (2013.01); *B32B 2471/00* (2013.01); *C08J 2327/06* (2013.01)

(58) Field of Classification Search
CPC ............... B32B 37/10; B32B 2255/26; B32B 2255/28; B32B 2327/06; E04F 15/105; E04F 15/107
See application file for complete search history.

(56) References Cited

U.S. PATENT DOCUMENTS

| | | | |
|---|---|---|---|
| 2018/0339504 A1* | 11/2018 | Ziegler | ................... B32B 21/08 |
| 2020/0316924 A1* | 10/2020 | Brown | ............... C09D 153/005 |

FOREIGN PATENT DOCUMENTS

| | | | |
|---|---|---|---|
| CN | 109627963 A | | 4/2019 |
| CN | 109821715 A | | 5/2019 |
| CN | 208815847 U | | 5/2019 |
| EP | 3495136 A1 | | 7/2020 |
| KR | 20150069676 A | * | 6/2015 |
| KR | 20150069676 A | | 6/2015 |

* cited by examiner

*Primary Examiner* — Carson Gross
(74) *Attorney, Agent, or Firm* — Jose Cherson Weissbrot

(57) ABSTRACT

The present application relates to the technical field of a floor composite material, and more particularly, the present application provides a composite material containing a PVC pre-coating film and a preparation method therefor. In the first aspect, the present application provides the method for preparing the composite material containing the PVC pre-coating film. The method comprises preparing the PVC pre-coating film by utilizing a PVC transparent film layer and a radiation-cured coating; performing high-temperature press fit on the PVC pre-coating film, a substrate material and a printed decorative layer; and then performing cooling and forming treatment to obtain the composite material containing the ultra-wear-resistant and easy-to-clean PVC pre-coating film.

8 Claims, No Drawings

METHOD FOR PREPARING COMPOSITE MATERIAL CONTAINING ULTRA-WEAR-RESISTANT AND EASY-TO-CLEAN PVC PRE-COATING FILM

FIELD

The present application relates to the technical field of floor composite materials, and more particularly, the present application provides a composite material containing an ultra-wear-resistant and easy-to-clean PVC pre-coating film and a preparation method therefor.

BACKGROUND

A PVC floor is a very popular novel light ground decoration material in the world today, has the advantages of being green and environment-friendly, super strong in wear resistance, wide in pattern and color varieties, fast and convenient in installation and construction and the like, and has been widely used and highly recognized in places with large flow of people such as hospitals, schools, office buildings, shopping malls, supermarkets and transportation means. In an actual use process, in order to meet the requirements of consumers on different performance such as wear resistance, scratch resistance, strength and good hand feeling of a floor surface, various functional coatings are often added to the floor surface to meet the requirements of different consumers on different types of floors.

At present, the PVC floor production generally involves various products with different performance such as SPC/LVT, and a PVC floor production process generally comprises PVC substrate material extruding, film coating (press fit), and then paint coating making, however, based on such a current traditional technology, for a textured substrate, when the roller coating manner is used, the uneven gloss phenomenon will be caused, and a concave part cannot be painted through roller coating, resulting in the difference in outsides of finished products; and in addition, it is difficult for the traditional PVC floor production technology to realize coating of a PVC floor with multiple coatings, and only single-pass coating or double-pass coating can be realized, wherein single-pass coating is only one-pass coating of a top coating, and double-pass coating is one-pass coating of primer and one-pass coating of a top coating. Due to the fact that the more paint coatings are made on PVC, the more stress shrinkage an SPC floor will generate due to curing of paint, resulting in warping of the PVC floor, and paving the floor on a ground will cause the floor to arch.

Based on these problems of a floor composite material in the prior art, the present application provides a method for preparing a composite material containing an ultra-wear-resistant and easy-to-clean PVC pre-coating film, the preparation method is simple, the apparatus and labor costs are saved on, meanwhile, the automatic production of a whole line is facilitated, the production efficiency is improved, the non-deformability of the obtained composite floor material is improved, the bad phenomena of warping and the like are avoided, and the uneven gloss phenomenon of the coating obtained by a traditional preparation method is solved.

SUMMARY

In order to solve the above-mentioned technical problems, in the first aspect, the present application provides a method for preparing a composite material containing an ultra-wear-resistant and easy-to-clean PVC pre-coating film, comprising the following steps:
(1) preparing the PVC pre-coating film by utilizing a PVC transparent film layer and a radiation-cured coating;
(2) performing a high-temperature press fit process on the PVC pre-coating film, a substrate material and a printed decorative layer; and
(3) performing cooling and forming treatment to obtain the composite material containing the ultra-wear-resistant and easy-to-clean PVC pre-coating film.

As a preferred technical solution of the present application, wherein the substrate material is selected from any one or more of an SPC substrate and an LVT substrate.

As a preferred technical solution of the present application, wherein the substrate material is the SPC substrate, and the high-temperature press fit process of the PVC pre-coating film, the substrate material and the printed decorative layer comprises: firstly, heating both the SPC substrate and the PVC pre-coating film to 160° C. to 180° C., and performing pressing treatment by a steel roller for 3 s to 10 s.

As a preferred technical solution of the present application, wherein the substrate material is the LVT substrate, and the high-temperature press fit process of the PVC pre-coating film, the substrate material and the printed decorative layer comprises: firstly, heating the LVT substrate and the PVC pre-coating film to 130° C. to 150° C., and performing press fit on a press for 20 min to 45 min.

As a preferred technical solution of the present application, wherein the radiation-cured coating comprises an adhesive primer layer, an elastic primer layer and a top coating layer sequentially from bottom to top.

As a preferred technical solution of the present application, wherein the top coating layer comprises a first-pass elastic top coating and a second-pass easy-to-clean top coating, the first-pass elastic top coating comprising, in parts by weight, 10 to 60 parts of bifunctional polyurethane acrylic resins A, 2 to 7 parts of initiators A, 10 to 60 parts of acrylate monomers A and 3 to 40 parts of additives A.

As a preferred technical solution of the present application, wherein the second-pass easy-to-clean top coating comprises, in parts by weight, 2 to 30 parts of acrylic modified organic silicone resins, 0.3 part to 3 parts of high-hardness micro-powder particles, 2 to 20 parts of bifunctional polyurethane acrylic resins B, 10 to 40 parts of polyfunctional polyurethane acrylic resins, 15 to 45 parts of acrylate monomers B, 2 to 7 parts of initiators B and 3 to 40 parts of additives B.

As a preferred technical solution of the present application, wherein preparation raw materials of the acrylic modified organic silicone resins comprise hydroxypolysiloxane, isocyanate B, a monohydroxy acrylate monomer B and a silane coupling agent.

As a preferred technical solution of the present application, wherein preparation raw materials of the polyfunctional polyurethane acrylic resins comprise a polyisocyanate and a hydroxyl-containing acrylate monomer A.

In the second aspect, the present application provides a composite material prepared according to the method for preparing the composite material.

Compared with the prior art, the present application provides the novel method for preparing the composite material. The method utilizes the high-temperature press fit manner of a PVC pre-coating film material, the substrate material and the printed decorative layer, so as to improve the non-deformability of an obtained composite floor material, avoid the bad phenomena of warping and the like, and solve the uneven gloss phenomenon of a coating obtained by a traditional preparation method; and meanwhile, the preparation method is simple, the apparatus and labor costs are saved on, meanwhile, the automatic production of a whole line is facilitated, and the production efficiency is improved.

DETAILED DESCRIPTION OF THE EMBODIMENTS

All parts and percentages in the present application are all weight-based and the test and characterization methods used are synchronized with the filing date of the present application unless otherwise noted, implied from the context, or falling within a practice of the prior art. If the definition of a specific term disclosed in the prior art is inconsistent with any definition provided in the present application, the definition of the term provided in the present application shall prevail.

The technical features in the technical solutions provided by the present application will be further clearly and completely described below in conjunction with the specific implementation, which is not intended to limit the scope of protection thereof.

The words "preferred", "preferably", "more preferred" and the like in the present application refer to the embodiments of the present application that may provide certain beneficial effects under certain circumstances. However, other embodiments may also be preferred under the same or other circumstances. In addition, the expression of one or more preferred embodiments does not imply that other embodiments are not available, nor is it intended to exclude other embodiments from the scope of the present application. The sources of components not mentioned in the present application are commercially available.

In order to solve the above-mentioned technical problems, in the first aspect, the present application provides a method for preparing a composite material containing an ultra-wear-resistant and easy-to-clean PVC pre-coating film, comprising the following steps:

(1) preparing the PVC pre-coating film by utilizing a PVC transparent film layer and a radiation-cured coating;
(2) performing a high-temperature press fit process on the PVC pre-coating film, a substrate material and a printed decorative layer; and
(3) performing cooling and forming treatment to obtain the composite material containing the ultra-wear-resistant and easy-to-clean PVC pre-coating film.

In one embodiment, the substrate material is selected from any one or more of an SPC substrate and an LUT substrate.

In one embodiment, the composite material comprises the PVC pre-coating film, the printed decorative layer and the substrate material sequentially from top to bottom.

In one embodiment, when the substrate material is an SPC substrate, the high-temperature press fit process of the PVC pre-coating film, the substrate material and the printed decorative layer comprises: heating the PVC pre-coating film, the substrate and the printed decorative layer to 160° C. to 180° C., and performing high-temperature press fit by a steel roller for 3 s to 10 s; and preferably, the high-temperature press fit process of the PVC pre-coating film, the substrate material and the printed decorative layer comprises: heating the PVC pre-coating film, the substrate and the printed decorative layer to 175° C. and performing high-temperature press fit by the steel roller for 5 s.

In one embodiment, when the substrate material is an LVT substrate, the high-temperature press fit process of the PVC pre-coating film, the substrate material and the printed decorative layer comprises: heating the PVC pre-coating film, the LVT substrate and the printed decorative layer to 130° C. to 150° C., and performing high-temperature press fit on a press for 20 min to 45 min; and preferably, the high-temperature press fit process of the PVC pre-coating film, the substrate material and the printed decorative layer comprises: heating the PVC pre-coating film, the LVT substrate and the printed decorative layer to 145° C., and performing high-temperature press fit on the press for 40 min.

The present application does not particularly limit the source of the printed decorative layer, and in one embodiment, the printed decorative layer is purchased from Shantou Haiyu Paper Co., Ltd.

In one embodiment, the radiation-cured coating comprises an adhesive primer layer, an elastic primer layer, and a top coating layer sequentially from bottom to top.

In a preparation process, a traditional composite material is obtained by making ultraviolet-cured paint on a PVC substrate material which is press-fitted at a high temperature, the adhesion force of an obtained PVC floor is poor, a paint coating is prone to fall off, and the stress shrinkage is caused by curing of the ultraviolet-cured paint, so that the PVC floor will also be bent and deformed, and for a textured PVC substrate material, the gloss of a PVC floor obtained through traditional roller coating is uneven, resulting in the difference between the high gloss and the low gloss; and the present application attempts to perform direct press fit on the PVC pre-coating film and the substrate to form the material, so as to solve the problems easily occurring in a traditional technology, due to the fact that the adhesive primer layer is made on the PVC pre-coating film, the coating is good in adhesion force, and is not prone to fall off, however, the applicant also has unexpectedly found that the cooperation of the high temperature is required in the press fit process, otherwise the combination between the PVC pre-coating film and SPC\LVT is not good, the high-temperature press fit process is also a stress release process, and the cooling shrinkage will not cause the PVC floor to bend and deform.

In one embodiment, the top coating layer comprises a first-pass elastic top coating and a second-pass easy-to-clean top coating.

In one embodiment, in parts by weight, the first-pass elastic top coating comprises 10 to 60 parts of bifunctional polyurethane acrylic resins A, 2 to 7 parts of initiators A, 10 to 60 parts of acrylate monomers A and 3 to 40 parts of additives A; preferably, the first-pass elastic top coating comprises 20 to 50 parts of bifunctional polyurethane acrylic resins A, 3 to 6 parts of initiators A, 20 to 50 parts of acrylate monomers A and 10 to 30 parts of additives A; and more preferably, the first-pass elastic top coating comprises 35 parts of bifunctional polyurethane acrylic resins A, 4.5 parts of initiators A, 35 parts of acrylate monomers A and 20 parts of additives A.

In one embodiment, the second-pass easy-to-clean top coating comprises, in parts by weight, 2 to 30 parts of acrylic modified organic silicone resins, 0.3 part to 3 parts of high-hardness micro-powder particles, 2 to 20 parts of bifunctional polyurethane acrylic resins B, 10 to 40 parts of polyfunctional polyurethane acrylic resins, 15 to 45 parts of acrylate monomers B, 2 to 7 parts of initiators B and 3 to 40 parts of additives B; preferably, the second-pass easy-to-clean top coating comprises, in parts by weight, 10 to 20 parts of acrylic modified organic silicone resins, 1 to 2 parts of high-hardness micro-powder particles, 5 to 15 parts of bifunctional polyurethane acrylic resins B, 20 to 30 parts of polyfunctional polyurethane acrylic resins, 20 to 40 parts of acrylate monomers B, 3 to 6 parts of initiators B and 10 to 30 parts of additives B; and more preferably, the second-pass easy-to-clean top coating comprises, in parts by weight, 15 parts of acrylic modified organic silicone resins, 1.5 parts of high-hardness micro-powder particles, 10 parts of bifunctional polyurethane acrylic resins B, 25 parts of polyfunctional polyurethane acrylic resins, 30 parts of acrylate monomers B, 4.5 parts of initiators B and 20 parts of additives B.

In one embodiment, preparation raw materials of the bifunctional polyurethane acrylic resins A comprise diol A, isocyanate A and a monohydroxy acrylate monomer A; preferably, a molar ratio of the diol A to the isocyanate A to the monohydroxy acrylate monomer A is 1:(2 to 3):(3 to 4); and more preferably, the molar ratio of the diol A to the isocyanate A to the monohydroxy acrylate monomer A is 1:2.5:3.5.

In one embodiment, the diol A is one or a combination of more of polycaprolactone diol, polyester diol, dimer acid modified diol and polytetrahydrofuran diol; preferably, the diol A is the polyester diol; further preferably, a weight-average molecular weight of the polyester diol is 2000 to 6000; and more preferably, a weight-average molecular weight of the polyester diol is 3000 to 4000.

The present application does not particularly limit the supplier of the polyester diol, and in one embodiment, the polyester diol is purchased from Changxing Chemical Industry Shares Co., Ltd.; and preferably, the polyester diol is any one of 5400-3000, 5400-3300, 5401-4000 and 5441-3000.

In one embodiment, the isocyanate A is selected from any one or a combination of more of toluene diisocyanate, isophorone diisocyanate and 4,4'-dicyclohexylmethane diisocyanate.

In one embodiment, the monohydroxy acrylate monomer A is selected from any one or a combination of more of hydroxyethyl acrylate, hydroxyethyl methacrylate and hydroxypropyl acrylate.

In one embodiment, the acrylate monomer A comprises at least one of a trifunctional acrylate monomer A, a bifunctional acrylate monomer A and a monofunctional acrylate monomer A; preferably, a ratio of the total mass of the bifunctional acrylate monomer A and the monofunctional acrylate monomer A to the mass of the trifunctional acrylate monomer A is 1:(1 to 4); and more preferably, the ratio of the total mass the bifunctional acrylate monomer A and the monofunctional acrylate monomer A to the mass of the trifunctional acrylate monomer A is 1:2.5.

In one embodiment, the trifunctional acrylate monomer A is selected from one or a combination of more of trimethylolpropane triacrylate and ethoxylated trimethylolpropane triacrylate.

In one embodiment, the bifunctional acrylate monomer A or the monofunctional acrylate monomer A is selected from any one or a combination of more of hydroxyethyl methacrylate, hydroxypropyl methacrylate, acryloylmorpholine, 1,6-hexanediol diacrylate, neopentyl glycol diacrylate, dipropylene glycol diacrylate, tripropylene glycol diacrylate and polyethylene glycol diacrylate.

In one embodiment, preparation raw materials of the acrylic modified organic silicone resins comprise hydroxypolysiloxane, isocyanate B, a monohydroxy acrylate monomer B and a silane coupling agent; preferably, a molar ratio of the hydroxypolysiloxane to the isocyanate B to the monohydroxy acrylate monomer B to the silane coupling agent is 1:(5 to 10):(3 to 10):(0.2 to 0.5); and more preferably, the molar ratio of the hydroxypolysiloxane to the isocyanate B to the monohydroxy acrylate monomer B to the silane coupling agent is 1:8:7:0.35.

In one embodiment, the hydroxypolysiloxane is one or a combination of more of hydroxyl-terminated polysiloxane or polyhydroxy polysiloxane; and the present application does not particularly limit the supplier of the hydroxypolysiloxane, and in one embodiment, the hydroxypolysiloxane is dihydroxy-terminated polysiloxane purchased from Shenzhen Jipeng Silicon Fluorine Material Co., Ltd.

In one embodiment, the isocyanate B is selected from any one or a combination of more of isophorone diisocyanate, isophorone diisocyanate trimer, hexamethylene diisocyanate biuret, hexamethylene diisocyanate trimer and 4,4'-dicyclohexylmethane diisocyanate.

In one embodiment, the monohydroxy acrylate monomer B is selected from any one or a combination of more of hydroxyethyl acrylate, dipentaerythritol hexaacrylate, pentaerythritol triacrylate, propoxylated pentaerythritol triacrylate, trimethylolpropane dimethacrylate and ethoxylated trimethylolpropane dimethacrylate.

In one embodiment, the silane coupling agent is selected from any one of vinyltriethoxysilane, vinyltrimethoxysilane, and vinyl tris($\beta$-methoxyethoxy)silane.

A process of preparing the acrylic modified organic silicone resin comprises: placing the hydroxypolysiloxane, the isocyanate B, the monohydroxy acrylate monomer B and the silane coupling agent into a solvent for reaction for 5 h to 8 h at 50° C. to 100° C., and then performing rotary evaporation to obtain the acrylic modified organic silicone resin.

In one embodiment, the solvent in the process of preparing the acrylic modified organic silicone resins is propylene glycol methyl ether acetate and/or butyl acetate.

In one embodiment, the particle size of the high-hardness micro-powder particle is 20 to 80 μm; and preferably, the particle size of the high-hardness micro-powder particle is 30 to 60 μm.

In one embodiment, the high-hardness micro-powder particle is selected from any one or a combination of more of diamond micro powder, white corundum micro powder, silicon carbide micro powder and alumina particles.

In one embodiment, preparation raw materials of the bifunctional polyurethane acrylic resins B comprise diol B, isocyanate C and a monohydroxy acrylate monomer C, wherein a weight-average molecular weight of the diol B is 500 to 4000; preferably, a molar ratio of the diol B to the isocyanate C to the monohydroxy acrylate monomer C is 1:(2 to 5):(3 to 6); and more preferably, the molar ratio of the diol B to the isocyanate C to the monohydroxy acrylate monomer C is 1:2.5:4.

In one embodiment, the diol B is one or a combination of more of polycaprolactone diol, polyester diol, dimer acid modified diol and polytetrahydrofuran diol; preferably, the diol B is the polyester diol or the polytetrahydrofuran diol; and further preferably, the diol B is the polyester diol, and a weight-average molecular weight of the polyester diol is 1000 to 3000.

The present application does not particularly limit the supplier of the polyester diol, and in one embodiment, the polyester diol is purchased from Changxing Chemical Industry Shares Co., Ltd.; and preferably, the polyester diol is any one of 5400-3000, 5400-3300, 5401-4000 and 5441-3000.

In one embodiment, the isocyanate C is selected from any one or a combination of more of toluene diisocyanate, isophorone diisocyanate and 4,4'-dicyclohexylmethane diisocyanate.

In one embodiment, the monohydroxy acrylate monomer C is selected from any one or a combination of more of hydroxyethyl acrylate, hydroxyethyl methacrylate and hydroxypropyl acrylate.

In one embodiment, a vitrification transition temperature of the polyfunctional polyurethane acrylic resins is 50° C. to 150° C.

In one embodiment, preparation raw materials of the polyfunctional polyurethane acrylic resins comprise polyisocyanate and a hydroxyl-containing acrylate monomer A; preferably, a molar ratio of the polyisocyanate to the hydroxyl-containing acrylate monomer A is 1:(2 to 5); and more preferably, the molar ratio of the polyisocyanate to the hydroxyl-containing acrylate monomer A is 1:3.5.

In one embodiment, the polyisocyanate is selected from any one or a combination of more of isophorone diisocyanate, 4,4'-dicyclohexylmethane diisocyanate, HDI dimer, HDI trimer, HDI biuret and IPDI trimer.

In one embodiment, the hydroxyl-containing acrylate monomer A is selected from any one or a combination of more of hydroxyethyl acrylate, hydroxyethyl methacrylate, hydroxybutyl acrylate, hydroxy methyl acrylate and hydroxypropyl methacrylate.

In one embodiment, a vitrification transition temperature of a homopolymer of the acrylate monomer B is 50° C. to 150° C., and preferably 80° C. to 150° C.

In one embodiment, the acrylate monomer B comprises at least one of a polyfunctional acrylate monomer, a bifunctional acrylate monomer B and a monofunctional acrylate monomer B; preferably, a ratio of the total mass of the bifunctional acrylate monomer B and the monofunctional acrylate monomer B to the mass of the polyfunctional acrylate monomer is (2 to 6):1; and more preferably, the ratio of the total mass the bifunctional acrylate monomer B and the monofunctional acrylate monomer B to the mass of the polyfunctional acrylate monomer is 3.5:1.

In one embodiment, the polyfunctional acrylate monomer is selected from any one or a combination of more of pentaerythritol triacrylate, pentaerythritol tetraacrylate, ditrimethylolpropane tetraacrylate and dipentaerythritol hexaacrylate.

In one embodiment, the bifunctional acrylate monomer B and the monofunctional acrylate monomer B are selected from any one or a combination of more of dipropylene glycol diacrylate, neopentyl glycol diacrylate and acryloylmorpholine.

In one embodiment, in parts by weight, preparation raw materials of the adhesive primer layer comprise 2 to 10 parts of bifunctional polyurethane acrylic resins C, 0 to 5 parts of vinyl chloride-vinyl acetate resins, 30 to 40 parts of bifunctional acrylate monomers C, 30 to 50 parts of solvents and 0 to 1 part of an initiator C; preferably, the preparation raw materials of the adhesive primer layer comprise 4 to 8 parts of bifunctional polyurethane acrylic resins C, 1 to 4 parts of vinyl chloride-vinyl acetate resins, 33 to 38 parts of bifunctional acrylate monomers C, 35 to 45 parts of solvents and 0.1 part to 0.8 part of an initiator C; and more preferably, the preparation raw materials of the adhesive primer layer comprise 6 parts of bifunctional polyurethane acrylic resins C, 3 parts of vinyl chloride-vinyl acetate resins, 35 parts of bifunctional acrylate monomers C, 40 parts of solvents and 0.5 part of an initiator C.

In one embodiment, in parts by weight, preparation raw materials of the elastic primer layer comprise 30 to 60 parts of bifunctional polyurethane acrylic resins C, 20 to 40 parts of bifunctional acrylate monomers C, 10 to 15 parts of monofunctional acrylate C and 0 to 5 parts of initiators C; preferably, the preparation raw materials of the elastic primer layer comprise 40 to 50 parts of bifunctional polyurethane acrylic resins C, 25 to 35 parts of bifunctional acrylate monomers C, 11 to 14 parts of monofunctional acrylate C and 1 to 4 parts of initiators C; and more preferably, the preparation raw materials of the elastic primer layer comprise 45 parts of bifunctional polyurethane acrylic resins C, 30 parts of bifunctional acrylate monomers C, 13 parts of monofunctional acrylate C and 3 parts of initiators C.

In one embodiment, preparation raw materials of each of the bifunctional polyurethane acrylic resins C comprise macromolecular diol, isocyanate D, micromolecular diol and a hydroxyl-containing acrylate monomer B; preferably, a molar ratio of the macromolecular diol to the isocyanate D to the micromolecular diol to the hydroxyl-containing acrylate monomer B is 1:(2.5 to 5):(1.5 to 3.5):(3 to 6); and more preferably, the molar ratio of the macromolecular diol to the isocyanate D to the micromolecular diol to the hydroxyl-containing acrylate monomer B is 1:4:2:3.

In one embodiment, the hydroxyl-containing acrylate monomer B is selected from any one or a combination of more of hydroxyethyl acrylate, hydroxyethyl methacrylate, hydroxybutyl acrylate, hydroxy methyl acrylate and hydroxypropyl methacrylate.

In one embodiment, the macromolecular diol is selected from any one or a combination of more of polycaprolactone diol, polyneopentyl glycol adipate dihydric alcohol, polycarbonate diol, polyadipate-1,4-butanediol ester diol, polyhexanedioyl glycol-propylene glycol ester diol, polyneopentyl glycol adipate-1,4-butanediol ester diol, polypropylene glycol ether diol and polytetrahydrofurazone ether glycol; preferably, a macromolecular diol B comprises the polycaprolactone diol and the polyneopentyl glycol adipate dihydric alcohol; further preferably, a weight ratio of the polycaprolactone diol to the polyneopentyl glycol adipate dihydric alcohol is 1:(0.5 to 1.5); and more preferably, the weight ratio of the polycaprolactone diol to the polyneopentyl glycol adipate dihydric alcohol is 1:1.

In one embodiment, a weight-average molecular weight of the polycaprolactone diol is 1000 to 3000; and preferably, the weight-average molecular weight of the polycaprolactone diol is 2000 to 2500.

In one embodiment, a weight-average molecular weight of the polyneopentyl glycol adipate dihydric alcohol is 2000 to 4000; and preferably, the weight-average molecular weight of the polyneopentyl glycol adipate dihydric alcohol is 3000 to 3500.

In one embodiment, the bifunctional acrylate monomer C is selected from any one or a combination of more of 1,6-hexanediol diacrylate, neopentyl glycol diacrylate, dipropylene glycol diacrylate and tripropylene glycol diacrylate; and preferably, the bifunctional acrylate monomer C is 1,6-hexanediol diacrylate.

The present application does not particularly limit the suppliers of the polycaprolactone diol, the polyneopentyl glycol adipate dihydric alcohol and the polycarbonate diol, and in one embodiment, the polycaprolactone diol, the polyneopentyl glycol adipate dihydric alcohol and the polycarbonate diol are purchased from Xuchuan Chemical.

In one embodiment, the vinyl chloride-vinyl acetate resin is a di-vinyl chloride-vinyl acetate resin and/or tri-vinyl chloride-vinyl acetate resin.

The present application does not particularly limit the supplier, and in one embodiment, the vinyl chloride-vinyl acetate resin is a vinyl chloride-vinyl acetate resin 14-50 purchased from Dongguan Yifan Resin Co., Ltd.

In one embodiment, the solvent is selected from any one or a combination of more of ethyl acetate, butyl acetate, dimethyl succinate, dimethyl glutarate, dimethyl adipate, methanol, n-butanol and ethanol.

In one embodiment, the monofunctional acrylate C is selected from any one or a combination of more of isobornyl acrylate, acryloylmorpholine, acrylic acid, methyl acrylate, ethyl acrylate, n-propyl acrylate, n-butyl acrylate, lauryl acrylate, stearyl acrylate, isopropyl acrylate, isobutyl acrylate, tert-butyl acrylate, hydroxyethyl acrylate, hydroxypropyl acrylate, hydroxybutyl acrylate and ethoxyethyl acrylate; preferably, the monofunctional acrylate is isobornyl acrylate and acryloylmorpholine; further preferably, a weight ratio of the isobornyl acrylate to the acryloylmorpholine is 1:(0.3 to 0.8); and more preferably, the weight ratio of the isobornyl acrylate to the acryloylmorpholine is 1:0.5.

In one embodiment, the micromolecular diol is selected from any one or a combination of more of 1,4-butanediol, 1,4-cyclohexanedimethanol, hydroxyethylated bisphenol A, ethylene glycol, propylene glycol, hexanediol, hydroquinone, neopentyl glycol and diethylene glycol; preferably, the micromolecular diol is selected from any one or a combination of more of the 1,4-butanediol, the 1,4-cyclohexanedimethanol and the hydroxyethylated bisphenol A; further preferably, the micromolecular diol comprises the 1,4-butanediol and the 1,4-cyclohexanedimethanol; further preferably, a weight ratio of the 1,4-butanediol to the 1,4-cyclohexanedimethanol is 1:(0.3 to 0.5); and more preferably, the weight ratio of the 1,4-butanediol to the 1,4-cyclohexanedimethanol is 1:0.45.

In one embodiment, the isocyanate D is selected from any one or a combination of more of toluene diisocyanate, isophorone diisocyanate, diphenylmethane diisocyanate, dicyclohexylmethane diisocyanate, hexamethylene diisocyanate and lysine diisocyanate.

The initiator A, the initiator B and the initiator C may be any one or more initiators disclosed in the prior art in the present field and are not particularly limited by the present application, and in one embodiment, the initiator A, the initiator B and the initiator are separately and independently selected from one or more of 1-hydroxycyclohexyl phenyl ketone (184), 2-hydroxy-2-methyl-1-phenyl-1-acetone (1173), 2-phenylbenzyl-2-dimethylamino-1-(4-morpholino benzylphenyl)butanone (369), phenyl bis(2,4,6-trimethylbenzoyl)phosphine oxide (819) and diphenyl(2,4,6-trimethylbenzoyl)phosphine oxide (TPO); and preferably, the initiators are diphenyl(2,4,6-trimethylbenzoyl)phosphine oxide (TPO).

In one embodiment, the additive A and the additive B are separately and independently selected from any one or a combination of more of a dispersant, a defoaming agent, a leveling agent, a pigment, matting powder, a flame retardant and a stabilizer; preferably, the additives are the matting powder, and the present application does not particularly limit the selection of the matting powder; and in one embodiment, the matting powder is GRACE SYLOID RAD2105.

The applicant has found that the service performance of the obtained composite material may be optimized by utilizing a PVC pre-coating film material and the substrate material, but not all materials can obtain a good composite material, certain composite materials will even become cracked or whitened, but when specific adhesive primer and elastic primer are adopted to cooperate with the top coating for use, the above-mentioned problems may be effectively avoided, when the two coatings of the adhesive primer layer and the elastic primer layer are used for combined action with the flexible PVC film material, the above-mentioned problems may be well avoided, and the two coatings of the adhesive primer layer and the elastic primer layer may adopt bifunctional polyurethane acrylate with different contents in the preparation processes, so as to adjust the mechanical performance and the polarity degrees of the adhesive primer layer and the elastic primer layer; meanwhile, the compatibility between different coatings is increased, the chance of the collision among molecules in a curing and film forming process is increased, the acting force between the coatings is increased, and the density and strength of the materials are improved, thereby increasing the adhesion force of the coatings and prolonging the maintenance time of the functionality, and meanwhile, increasing the compatibility between the coating materials and the substrate material, so as to increase the adhesion force; and on the other hand, the bifunctional polyurethane acrylate with different contents is mixed and compatible with different-functionality acrylate and vinyl chloride-vinyl acetate resins, by adjusting the compatibility and mechanical performance thereof, the problems of whitening, cracking and the like caused by decomposition, curing, softening and the like in the high-temperature press fit process are avoided.

The present application does not particularly limit the source of the PVC transparent film layer, and in one embodiment, the PVC transparent film layer is purchased from Jiangsu Green Meibang.

In one embodiment, a method for preparing the PVC pre-coating film comprises the following steps:
(1) separately and uniformly stirring the preparation raw materials of the adhesive primer layer, the elastic primer layer and the top coating layer by a dispersion kettle to obtain finished paint;
(2) uniformly coating a surface of the PVC transparent film layer with the adhesive primer layer by a roller, and performing LED-UV curing;
(3) uniformly coating a surface of the adhesive primer layer with the elastic primer layer by a roller, and performing LED-UV curing; and
(4) uniformly coating a surface of the elastic primer layer with the top coating layer by a roller, and performing UV curing to obtain the PVC pre-coating film.

In one embodiment, a coating weight of the adhesive primer layer is 3 to 15 $g/m^2$; preferably, a coating weight of the adhesive primer layer is 4 to 10 $g/m^2$; and more preferably, a coating weight of the adhesive primer layer is 4 $g/m^2$.

In one embodiment, a coating weight of the elastic primer layer is 3 to 20 $g/m^2$; preferably, a coating weight of the elastic primer layer is 6 to 15 $g/m^2$; and more preferably, a coating weight of the elastic primer layer is 12 $g/m^2$.

In one embodiment, a coating weight of the top coating layer is 3 to 20 $g/m^2$; preferably, a coating weight of the top coating layer is 6 to 15 $g/m^2$; and more preferably, a coating weight of the top coating layer is 12 $g/m^2$.

In one embodiment, the wave length of an LED-UV light source in step (2) is 200 to 800 nm, and the energy intensity of a lamp source is greater than 7 $W/cm^2$; and preferably, the wave length of the LED-UV light source in step (2) is selected from any one of 365 nm, 385 nm and 395 nm, and the energy intensity of the lamp source is 10 W/cm² to 12 W/cm².

In one embodiment, the wave length of an LED-UV light source in step (3) is 200 to 800 nm, and the energy intensity of a lamp source is greater than 7 W/cm²; and preferably, the wave length of the LED-UV light source in step (3) is selected from any one of 365 nm, 385 nm and 395 nm, and the energy intensity of the lamp source is 10 W/cm² to 12 W/cm².

In the second aspect, the present application provides a composite material prepared according to the method for preparing the composite material.

Example 1

Example 1 of the present application provides a composite material containing a PVC pre-coating film, and a preparation method therefor comprises the following steps:
(1) preparing the PVC pre-coating film by utilizing a PVC transparent film layer and a radiation-cured coating;
(2) heating the PVC pre-coating film, an SPC substrate and a printed decorative layer to 175° C., and performing high-temperature press fit by a steel roller for 5 s; and
(3) performing cooling and forming treatment to obtain the composite material containing the ultra-wear-resistant and easy-to-clean PVC pre-coating film.

The radiation-cured coating comprises an adhesive primer layer, an elastic primer layer and a top coating layer sequentially from bottom to top;

the composite material comprises the PVC pre-coating film, the printed decorative layer and a substrate material sequentially from top to bottom;

the top coating layer comprises a first-pass elastic top coating and a second-pass easy-to-clean top coating, the first-pass elastic top coating comprises 35 parts of bifunctional polyurethane acrylic resins A, 4.5 parts of initiators A, 35 parts of acrylate monomers A and 20 parts of additives A, and the second-pass easy-to-clean top coating comprises 15 parts of acrylic modified organic silicone resins, 1.5 parts of high-hardness micro-powder particles, 10 parts of bifunctional polyurethane acrylic resins B, 25 parts of polyfunctional polyurethane acrylic resins, 30 parts of acrylate monomers B, 4.5 parts of initiators B and 20 parts of additives B;

preparation raw materials of the bifunctional polyurethane acrylic resins A comprise diol A, isocyanate A and a monohydroxy acrylate monomer A, wherein a molar ratio of the diol A to the isocyanate A to the monohydroxy acrylate monomer A is 1:2.5:3.5;

the diol A is polyester diol 5400-3300, the isocyanate A is toluene diisocyanate, and the monohydroxy acrylate monomer A is hydroxyethyl methacrylate;

the acrylate monomer A comprises ethoxylated trimethylolpropane triacrylate and acryloylmorpholine, wherein a mass ratio of the ethoxylated trimethylolpropane triacrylate to the acryloylmorpholine is 1:2.5;

preparation raw materials of the acrylic modified organic silicone resins comprise hydroxypolysiloxane, isocyanate B, a monohydroxy acrylate monomer B and a silane coupling agent, wherein a molar ratio of the hydroxypolysiloxane to the isocyanate B to the monohydroxy acrylate monomer B to the silane coupling agent is 1:8:7:0.35;

the isocyanate B is isophorone diisocyanate, the monohydroxy acrylate monomer B is hydroxyethyl acrylate, the silane coupling agent is vinyltriethoxysilane, and the hydroxypolysiloxane is dihydroxy-terminated polysiloxane purchased from Shenzhen Jipeng Silicon Fluorine Material Co., Ltd;

a preparation process of the acrylic modified organic silicone resin comprises: placing the hydroxypolysiloxane, the isocyanate B, the monohydroxy acrylate monomer B and the silane coupling agent into a solvent for reaction for 7 h at 80° C., and performing rotary evaporation to obtain the acrylic modified organic silicone resin; and the high-hardness micro-powder particle is white corundum micro powder, preparation raw materials of the bifunctional polyurethane acrylic resins B comprise diol B, isocyanate C and a monohydroxy acrylate monomer C, wherein the diol B is polyester diol 5400-3000, the isocyanate C is isophorone diisocyanate, and the monohydroxy acrylate monomer C is hydroxyethyl methacrylate;

preparation raw materials of the polyfunctional polyurethane acrylic resins comprise polyisocyanate and a hydroxyl-containing acrylate monomer A, wherein the polyisocyanate is isophorone diisocyanate, the hydroxyl-containing acrylate monomer A is hydroxypropyl methacrylate, and a molar ratio of the polyisocyanate to the hydroxyl-containing acrylate monomer A is 1:3.5;

the acrylate monomer B comprises neopentyl glycol diacrylate and dipentaerythritol hexaacrylate, wherein a mass ratio of the neopentyl glycol diacrylate to the dipentaerythritol hexaacrylate is 3.5:1;

preparation raw materials of the adhesive primer layer comprise 6 parts of bifunctional polyurethane acrylic resins C, 3 parts of vinyl chloride-vinyl acetate resins, 35 parts of bifunctional acrylate monomers C, 40 parts of solvents and 0.5 part of an initiator C;

preparation raw materials of the elastic primer layer comprise 45 parts of bifunctional polyurethane acrylic resins C, 30 parts of bifunctional acrylate monomers C, 13 parts of monofunctional acrylate C and 3 parts of initiators C;

preparation raw materials of each of the bifunctional polyurethane acrylic resins C comprise macromolecular diol, isocyanate D, micromolecular diol and a hydroxyl-containing acrylate monomer B, wherein a molar ratio of the macromolecular diol to the isocyanate D to the micromolecular diol to the hydroxyl-containing acrylate monomer B is 1:4:2:3;

the hydroxyl-containing acrylate monomer B is hydroxy methyl acrylate;

the macromolecular diol comprises polycaprolactone diol and polyneopentyl glycol adipate dihydric alcohol, wherein a weight ratio of the polycaprolactone diol to the polyneopentyl glycol adipate dihydric alcohol is 1:1;

the bifunctional acrylate monomer C is 1,6-hexanediol diacrylate;

the vinyl chloride-vinyl acetate resin is a vinyl chloride-vinyl acetate resin 14-50;

the solvent is butyl acetate;

the monofunctional acrylate C is isobornyl acrylate and acryloylmorpholine, wherein a weight ratio of the isobornyl acrylate to the acryloylmorpholine is 1:0.5;

the micromolecular diol comprises 1,4-butanediol and 1,4-cyclohexanedimethanol, wherein a weight ratio of the 1,4-butanediol to the 1,4-cyclohexanedimethanol is 1:0.45;

the isocyanate D is isophorone diisocyanate;

the initiator A, the initiator B and the initiator C are all diphenyl(2,4,6-trimethylbenzoyl)phosphine oxide (TPO);

the additive A and the additive B are both matting powder;

A method for preparing the PVC pre-coating film comprises the following steps:
(1) separately and uniformly stirring the preparation raw materials of the adhesive primer layer, the elastic primer layer and the top coating layer by a dispersion kettle;
(2) uniformly coating a surface of the PVC transparent film layer with the adhesive primer layer by a roller, and performing LED-UV curing, wherein a coating weight of the adhesive primer layer is 4 g/m$^2$, the wave length of an LED-UV light source in step (2) is 395 nm, and the energy intensity of a lamp source is 10 W/cm$^2$;
(3) then uniformly coating a surface of the adhesive primer layer with the elastic primer layer by a roller, and performing LED-UV curing, wherein a coating weight of the elastic primer layer is 12 g/m$^2$, the wave length of an LED-UV light source in step (3) is 395 nm, and the energy intensity of a lamp source is 10 W/cm$^2$; and
(4) uniformly coating a surface of the elastic primer layer with the top coating layer by a roller, and performing UV curing to obtain the PVC pre-coating film.

Example 2

Example 2 of the present application provides a composite material containing a PVC pre-coating film, and a preparation method therefor comprises the following steps:
(1) preparing the PVC pre-coating film by utilizing a PVC transparent film layer and a radiation-cured coating;
(2) heating the PVC pre-coating film, an SPC substrate and a printed decorative layer to 175° C., and performing high-temperature press fit by a steel roller for 5 s; and
(3) performing cooling and forming treatment to obtain the composite material containing the ultra-wear-resistant and easy-to-clean PVC pre-coating film.

The radiation-cured coating comprises an adhesive primer layer, an elastic primer layer and a top coating layer sequentially from bottom to top;
the composite material comprises the PVC pre-coating film, the printed decorative layer and a substrate material sequentially from top to bottom;
the top coating layer comprises a first-pass elastic top coating and a second-pass easy-to-clean top coating, the first-pass elastic top coating comprises 60 parts of bifunctional polyurethane acrylic resins A, 7 parts of initiators A, 60 parts of acrylate monomers A and 40 parts of additives A, and the second-pass easy-to-clean top coating comprises 30 parts of acrylic modified organic silicone resins, 3 parts of high-hardness micro-powder particles, 20 parts of bifunctional polyurethane acrylic resins B, 40 parts of polyfunctional polyurethane acrylic resins, 45 parts of acrylate monomers B, 7 parts of initiators B and 40 parts of additives B;
preparation raw materials of the bifunctional polyurethane acrylic resins A comprise diol A, isocyanate A and a monohydroxy acrylate monomer A, wherein a molar ratio of the diol A to the isocyanate A to the monohydroxy acrylate monomer A is 1:2.5:3.5;
the diol A is polyester diol 5400-3300, the isocyanate A is toluene diisocyanate, and the monohydroxy acrylate monomer A is hydroxyethyl methacrylate;
the acrylate monomer A comprises ethoxylated trimethylolpropane triacrylate and acryloylmorpholine, wherein a mass ratio of the ethoxylated trimethylolpropane triacrylate to the acryloylmorpholine is 1:2.5;

preparation raw materials of the acrylic modified organic silicone resins comprise hydroxypolysiloxane, isocyanate B, a monohydroxy acrylate monomer B and a silane coupling agent, wherein a molar ratio of the hydroxypolysiloxane to the isocyanate B to the monohydroxy acrylate monomer B to the silane coupling agent is 1:10:10:0.5;
the isocyanate B is isophorone diisocyanate, the monohydroxy acrylate monomer B is hydroxyethyl acrylate, the silane coupling agent is vinyltriethoxysilane, the hydroxypolysiloxane is dihydroxy-terminated polysiloxane purchased from Shenzhen Jipeng Silicon Fluorine Material Co., Ltd;
a preparation process of the acrylic modified organic silicone resin comprises: placing the hydroxypolysiloxane, the isocyanate B, the monohydroxy acrylate monomer B and the silane coupling agent into a solvent for reaction for 7 h at 80° C., and performing rotary evaporation to obtain the acrylic modified organic silicone resin;
the high-hardness micro-powder particle is white corundum micro powder;
preparation raw materials of the bifunctional polyurethane acrylic resins B comprise diol B, isocyanate C and a monohydroxy acrylate monomer C, wherein the diol B is polyester diol 5400-3000, the isocyanate C is isophorone diisocyanate, and the monohydroxy acrylate monomer C is hydroxyethyl methacrylate;
preparation raw materials of the polyfunctional polyurethane acrylic resins comprise polyisocyanate and a hydroxyl-containing acrylate monomer A, wherein the polyisocyanate is isophorone diisocyanate, the hydroxyl-containing acrylate monomer A is hydroxypropyl methacrylate, and a molar ratio of the polyisocyanate to the hydroxyl-containing acrylate monomer A is 1:5;
the acrylate monomer B comprises neopentyl glycol diacrylate and dipentaerythritol hexaacrylate, wherein a mass ratio of the neopentyl glycol diacrylate to the dipentaerythritol hexaacrylate is 3.5:1;
preparation raw materials of the adhesive primer layer comprise 10 parts of bifunctional polyurethane acrylic resins C, 5 parts of vinyl chloride-vinyl acetate resins, 40 parts of bifunctional acrylate monomers C, 50 parts of solvents and 1 part of an initiator C;
preparation raw materials of the elastic primer layer comprise 60 parts of bifunctional polyurethane acrylic resins C, 40 parts of bifunctional acrylate monomers C, 15 parts of monofunctional acrylate C and 5 parts of initiators C;
preparation raw materials of each of the bifunctional polyurethane acrylic resins C comprise macromolecular diol, isocyanate D, micromolecular diol and a hydroxyl-containing acrylate monomer B, wherein a molar ratio of the macromolecular diol to the isocyanate D to the micromolecular diol to the hydroxyl-containing acrylate monomer B is 1:4:2:3;
the hydroxyl-containing acrylate monomer B is hydroxy methyl acrylate;
the macromolecular diol comprises polycaprolactone diol and polyneopentyl glycol adipate dihydric alcohol, wherein a weight ratio of the polycaprolactone diol to the polyneopentyl glycol adipate dihydric alcohol is 1:1;
the bifunctional acrylate monomer C is 1,6-hexanediol diacrylate;
the vinyl chloride-vinyl acetate resin is a vinyl chloride-vinyl acetate resin 14-50;
the solvent is butyl acetate;
the monofunctional acrylate C is isobornyl acrylate and acryloylmorpholine, wherein a weight ratio of the isobornyl acrylate to the acryloylmorpholine is 1:0.5;

the micromolecular diol comprises 1,4-butanediol and 1,4-cyclohexanedimethanol, wherein a weight ratio of the 1,4-butanediol to the 1,4-cyclohexanedimethanol is 1:0.45;

the isocyanate D is isophorone diisocyanate;

the initiator A, the initiator B and the initiator C are all diphenyl(2,4,6-trimethylbenzoyl)phosphine oxide (TPO); and the additive A and the additive B are both matting powder.

A method for preparing the PVC pre-coating film is the same as that in embodiment 1.

Example 3

Example 3 of the present application provides a composite material containing a PVC pre-coating film, and a preparation method therefor comprises the following steps:

(1) preparing the PVC pre-coating film by utilizing a PVC transparent film layer and a radiation-cured coating;

(2) heating the PVC pre-coating film, an SPC substrate and a printed decorative layer to 175° C., and performing high-temperature press fit by a steel roller for 5 s; and (3) performing cooling and forming treatment to obtain the composite material containing the ultra-wear-resistant and easy-to-clean PVC pre-coating film.

The radiation-cured coating comprises an adhesive primer layer, an elastic primer layer and a top coating layer sequentially from bottom to top;

the composite material comprises the PVC pre-coating film, the printed decorative layer and a substrate material sequentially from top to bottom;

the top coating layer comprises a first-pass elastic top coating and a second-pass easy-to-clean top coating, the first-pass elastic top coating comprises 1 part of a bifunctional polyurethane acrylic resin A, 2 parts of initiators A, 10 parts of acrylate monomers A and 3 parts of additives A, and the second-pass easy-to-clean top coating comprises 2 parts of acrylic modified organic silicone resins, 0.3 part of a high-hardness micro-powder particle, 2 parts of bifunctional polyurethane acrylic resins B, 10 parts of polyfunctional polyurethane acrylic resins, 15 parts of acrylate monomers B, 2 parts of initiators B and 3 parts of additives B;

preparation raw materials of the bifunctional polyurethane acrylic resins A comprise diol A, isocyanate A and a monohydroxy acrylate monomer A, wherein a molar ratio of the diol A to the isocyanate A to the monohydroxy acrylate monomer A is 1:2.5:3.5;

the diol A is polyester diol 5400-3300, the isocyanate A is toluene diisocyanate, and the monohydroxy acrylate monomer A is hydroxyethyl methacrylate;

the acrylate monomer A comprises ethoxylated trimethylolpropane triacrylate and acryloylmorpholine, wherein a mass ratio of the ethoxylated trimethylolpropane triacrylate to the acryloylmorpholine is 1:2.5;

preparation raw materials of the acrylic modified organic silicone resins comprise hydroxypolysiloxane, isocyanate B, a monohydroxy acrylate monomer B and a silane coupling agent, wherein a molar ratio of the hydroxypolysiloxane to the isocyanate B to the monohydroxy acrylate monomer B to the silane coupling agent is 1:5:3:0.2;

the isocyanate B is isophorone diisocyanate, the monohydroxy acrylate monomer B is hydroxyethyl acrylate, the silane coupling agent is vinyltriethoxysilane, and the hydroxypolysiloxane is dihydroxy-terminated polysiloxane purchased from Shenzhen Jipeng Silicon Fluorine Material Co., Ltd;

a preparation process of the acrylic modified organic silicone resin comprises: placing the hydroxypolysiloxane, the isocyanate B, the monohydroxy acrylate monomer B and the silane coupling agent into a solvent for reaction for 7 h at 80° C., and performing rotary evaporation to obtain the acrylic modified organic silicone resins;

the high-hardness micro-powder particle is white corundum micro powder;

preparation raw materials of the bifunctional polyurethane acrylic resins B comprise diol B, isocyanate C and a monohydroxy acrylate monomer C, wherein the diol B is polyester diol 5400-3000, the isocyanate C is toluene diisocyanate, and the monohydroxy acrylate monomer C is hydroxyethyl methacrylate;

preparation raw materials of the polyfunctional polyurethane acrylic resins comprise polyisocyanate and a hydroxyl-containing acrylate monomer A, wherein the polyisocyanate is isophorone diisocyanate, the hydroxyl-containing acrylate monomer A is hydroxypropyl methacrylate, and a molar ratio of the polyisocyanate to the hydroxyl-containing acrylate monomer A is 1:2;

the acrylate monomer B comprises neopentyl glycol diacrylate and dipentaerythritol hexaacrylate, wherein a mass ratio of the neopentyl glycol diacrylate to the dipentaerythritol hexaacrylate is 3.5:1;

preparation raw materials of the adhesive primer layer comprise 2 parts of bifunctional polyurethane acrylic resins C, 1 part of a vinyl chloride-vinyl acetate resin, 30 parts of bifunctional acrylate monomers C, 30 parts of solvents and 0.1 part of an initiator C;

preparation raw materials of the elastic primer layer comprise 30 parts of bifunctional polyurethane acrylic resins C, 20 parts of bifunctional acrylate monomers C, 10 parts of monofunctional acrylate C and 1 part of an initiator C;

preparation raw materials of each of the bifunctional polyurethane acrylic resins C comprise macromolecular diol, isocyanate D, micromolecular diol and a hydroxyl-containing acrylate monomer B, wherein a molar ratio of the macromolecular diol to the isocyanate D to the micromolecular diol to the hydroxyl-containing acrylate monomer B is 1:4:2:3;

the hydroxyl-containing acrylate monomer B is hydroxy methyl acrylate;

the macromolecular diol comprises polycaprolactone diol and polyneopentyl glycol adipate dihydric alcohol, wherein a weight ratio of the polycaprolactone diol to the polyneopentyl glycol adipate dihydric alcohol is 1:1;

the bifunctional acrylate monomer C is 1,6-hexanediol diacrylate;

the vinyl chloride-vinyl acetate resin is a vinyl chloride-vinyl acetate resin 14-50;

the solvent is butyl acetate;

the monofunctional acrylate C is isobornyl acrylate and acryloylmorpholine, wherein a weight ratio of the isobornyl acrylate to the acryloylmorpholine is 1:0.5;

the micromolecular diol comprises 1,4-butanediol and 1,4-cyclohexanedimethanol, wherein a weight ratio of the 1,4-butanediol to the 1,4-cyclohexanedimethanol is 1:0.45;

the isocyanate D is isophorone diisocyanate;

the initiator A, the initiator B and the initiator C are all diphenyl(2,4,6-trimethylbenzoyl)phosphine oxide (TPO); and the additive A and the additive B are both matting powder.

A method for preparing the PVC pre-coating film is the same as that in embodiment 1.

Example 4

Example 4 of the present application provides a composite material containing a PVC pre-coating film, the specific implementation thereof is the same as that in embodiment 1, and the difference lies in that a method for preparing the composite material comprises: heating the PVC pre-coating film, an LUT substrate and a printed decorative layer to 145° C., performing high-temperature press fit on a press for 40 min, and performing cooling and forming treatment to obtain the composite material.

Example 5

Example 5 of the present application provides a composite material containing a PVC pre-coatig film, the specific implementation thereof is the same as that in embodiment 1, and the difference lies in that a preparation method therefor comprises the following steps:
(1) preparing the PVC pre-coating film by utilizing a PVC transparent film layer and a radiation-cured coating;
(2) heating the PVC pre-coating film, an SPC substrate and a printed decorative layer to 120° C. and performing high-temperature press fit by a steel roller for 5 s; and
(3) performing cooling and forming treatment to obtain the composite material containing the ultra-wear-resistant and easy-to-clean PVC pre-coating film.

Example 6

Example 6 of the present application provides a composite material containing a PVC pre-coatig film, the specific implementation thereof is the same as that in embodiment 1, and the difference lies in that a method for preparing the composite material comprises:
(1) heating a PVC transparent film layer, a printed decorative layer and an SPC substrate to 175° C., and performing pressing treatment by a steel roller for 5 s;
(2) separately and uniformly stirring preparation raw materials of an adhesive primer layer, an elastic primer layer and a top coating layer by a dispersion kettle;
(3) then uniformity coating a surface of the PVC transparent film layer with the adhesive primer layer by a roller, and performing LED-UV curing, wherein a coating weight of the adhesive primer layer is 8 g/m$^2$, the wave length of an LED-UV light source in step (3) is 395 nm, and the energy intensity of a lamp source is 10 W/cm$^2$;
(4) then uniformly coating a surface of the adhesive primer layer with the elastic primer layer by a roller, and performing LED-UV curing, wherein a coating weight of the elastic primer layer is 12 g/m$^2$, the wave length of an LED-UV light source in step (4) is 395 nm, and the energy intensity of a lamp source is 10 W/cm$^2$; and
(4) finally, uniformly coating a surface of the elastic primer layer with the top coating layer by a roller, and performing UV curing to obtain the composite material.

Example 7

Example 7 of the present application is the same as example 6, and the difference lies in that no elastic primer layer is arranged, an adhesive primer layer is replaced by a primer layer, the primer layer is purchased from Hunan Banferd New Material Technology Co., Ltd., the name being PVC floor matte primer, and the model being BPVC-1305, a top coating layer is replaced by an ordinary top coating, and the top coating is purchased from Hunan Banferd New Material Technology Co., Ltd., the name being PVC floor matte top coating, and the model being BPVC-1515-05.

Example 8

Example 8 of the present application provides a composite material containing a PVC pre-coating film, the specific implementation thereof is the same as that in embodiment 1, and the difference lies in that the PVC pre-coating film is not provided with an adhesive primer layer and an elastic primer layer.

Example 9

Example 9 of the present application provides a composite material containing a PVC pre-coating film, the specific implementation thereof is the same as that in embodiment 1, and the difference lies in that the PVC pre-coating film is not provided with an adhesive primer layer.

Example 10

Example 10 of the present application provides a composite material containing a PVC pre-coating film, the specific implementation thereof is the same as that in embodiment 1, and the difference lies in that the PVC pre-coating film is not provided with an elastic primer layer.

Example 11

Example 11 of the present application provides a composite material containing a PVC pre-coating film, the specific implementation thereof is the same as that in embodiment 1, and the difference lies in that preparation raw materials of an adhesive primer layer comprise 25 parts of bifunctional polyurethane acrylic resins C, 3 parts of vinyl chloride-vinyl acetate resins, 35 parts of bifunctional acrylate monomers C, 40 parts of solvents and 0.5 part of an initiator C.

Example 12

Example 12 of the present application provides a composite material containing a PVC pre-coating film, the specific implementation thereof is the same as that in embodiment 1, and the difference lies in that preparation raw materials of an adhesive primer layer comprise 0 part of a bifunctional polyurethane acrylic resin C, 3 parts of vinyl chloride-vinyl acetate resins, 35 parts of bifunctional acrylate monomers C, 40 parts of solvents and 0.5 part of an initiator C.

Example 13

Example 13 of the present application provides a composite material containing a PVC pre-coating film, the specific implementation thereof is the same as that in embodiment 1, and the difference lies in that preparation raw materials of an elastic primer layer comprise 15 parts of bifunctional polyurethane acrylic resins C, 30 parts of bifunctional acrylate monomers C, 13 parts of monofunctional acrylate C and 3 parts of initiators C.

Example 14

Example 14 of the present application provides a composite material containing a PVC pre-coating film, the specific implementation thereof is the same as that in embodiment 1, and the difference lies in that preparation raw materials of an elastic primer layer comprise 0 part of a bifunctional polyurethane acrylic resin C, 30 parts of bifunctional acrylate monomers C, 13 parts of monofunctional acrylate C and 3 parts of initiators C.

Example 15

Example 15 of the present application provides a composite material containing a PVC pre-coating film, the specific implementation thereof is the same as that in embodiment 1, and the difference lies in that preparation raw materials of an adhesive primer layer comprise 25 parts of bifunctional polyurethane acrylic resins C, 0 part of a vinyl chloride-vinyl acetate resin, 35 parts of bifunctional acrylate monomers C, 40 parts of solvents and 0.5 part of an initiator C.

Performance Test

1. The adhesion force of embodiments 1 to 15 is tested according to the standard ASTM D3359, and experimental results are shown in Table 1;
2. a processing performance test for the PVC pre-coating film comprises: observing whether PVC pre-coating films have the problems of whitening and cracking in processes of preparing composite materials by the PVC pre-coating films obtained in embodiments 1 to 15, wherein each embodiment corresponds to 100 samples, and calculating the probability of whitening and cracking, and test results are shown in Table 1;
3. the scratch resistance of embodiment 1 and embodiment 7 is tested according to the test standard ISO 1518, as can be seen from experimental results, the test result of the scratch resistance of embodiment 1 is 3.0 KG and the test result of the scratch resistance of embodiment 7 is 2.0 KG;
4. a cleaning performance test comprises: placing composite materials obtained in embodiment 1 and embodiment 7 under the room temperature condition, using a ZEBRA oily pen, wherein an angle of 90 degrees or so is formed between the oily pen and surfaces of coatings, applying the force of 1 to 2 N to draw five pieces of 5 to 10 mm handwriting on each of the surfaces of the coatings at a uniform speed, leaving to stand for 2 min, and wiping the surfaces with a dust-free cloth; as can be seen from experimental results, all the five pieces of handwriting in embodiment 1 can be easily wiped up, and the five pieces of handwriting in embodiment 7 cannot be wiped up, and marks are obvious; and
5. a warping test comprises: performing a heating warping test on composite materials obtained in embodiments 1 to 4 and 6 to 7 according to the standard GB 4085-2005, and test results are shown in Table 1.

TABLE 1

| | Performance test results | | |
|---|---|---|---|
| | Adhesion force | Whitening and cracking (%) | Heating warping (mm) |
| Example 1 | 5B | 0 | 0.1 |
| Example 2 | 5B | 1 | 0.08 |
| Example 3 | 5B | 1 | 0.07 |
| Example 4 | 5B | 0 | 0.1 |
| Example 5 | Poor press fit | \ | \ |
| Example 6 | 5B | 0 | 3 |
| Example 7 | 3B | 0 | 1 |
| Example 8 | 0B | 98 | \ |
| Example 9 | 1B | 70 | \ |
| Example 10 | 4B | 91 | \ |
| Example 11 | 4B | 11 | \ |
| Example 12 | 4B | 34 | \ |
| Example 13 | 5B | 70 | \ |
| Example 14 | 5B | 92 | \ |
| Example 15 | 3B | 3 | \ |

As can be seen from the experimental results, a method provided by the present application utilizes the high-temperature press fit manner of a PVC pre-coating film material, a substrate material and a printed decorative layer to improve the non-deformability of an obtained composite floor material and avoid the bad phenomena of warping and the like; and meanwhile, the PVC coating film material suitable for high-temperature press fit is designed and prepared in the present application, so that the bad phenomena of cracking, whitening and the like occurring in the preparation process under the high-temperature condition are avoided.

The foregoing examples are only illustrative and serve to explain certain features of the method of the present application. The appended claims are intended to claim the conceivable scope as broad as possible, and the embodiments presented herein are only the description of the selected implementation according to the combination of all possible embodiments. Therefore, the intention of the applicant lies in that the appended claims will not be limited by the choice of the examples illustrating the features of the present application. Certain numerical ranges used in the claims also comprise the sub-ranges therein, and where possible, the variations of these ranges should also be construed as being covered by the appended claims.

What is claimed is:

1. A method for preparing a composite material containing a PVC pre-coating film, comprising the following steps:
    preparing the PVC pre-coating film by utilizing a PVC transparent film layer and a radiation-cured coating;
    performing a high-temperature press fit process on the PVC pre-coating film, a substrate material and a printed decorative layer; and
    performing cooling and forming treatment to obtain the composite material containing the PVC pre-coating film;
    wherein the radiation-cured coating comprises an adhesive primer layer, an elastic primer layer and a top coating layer sequentially from bottom to top;
    wherein preparation raw materials of the adhesive primer layer comprise 2 to 10 parts of bifunctional polyurethane acrylic resins (C), 0 to 5 parts of vinyl chloride-vinyl acetate resins, 30 to 40 parts of bifunctional acrylate monomers (C), 30 to 50 parts of solvents and 0 to 1 part of an initiator (C);
    wherein preparation raw materials of the elastic primer layer comprise 30 to 60 parts of bifunctional polyurethane acrylic resins (C), 20 to 40 parts of bifunctional acrylate monomers (C), 10 to 15 parts of monofunctional acrylate (C) and 0 to 5 parts of initiators (C).
2. The method for preparing the composite material according to claim 1, wherein the substrate material is one or more selected from a group consisting of an SPC substrate and an LVT substrate.

3. The method for preparing the composite material according to claim 2, wherein the substrate material is an SPC substrate, and the high-temperature press fit process on the PVC pre-coating film, the substrate material and the printed decorative layer comprises: firstly, heating all of the SPC substrate, the PVC pre-coating film and the printed decorative layer to 160° C. to 180° C., and performing pressing treatment by a steel roller for 3 s to 10 s.

4. The method for preparing the composite material according to claim 2, wherein the substrate material is an LVT substrate, and the high-temperature press fit process on the PVC pre-coating film, the substrate material and the printed decorative layer comprises: firstly, heating all of the NVT substrate, the PVC pre-coating film and the printed decorative layer to 130° C. to 150° C., and performing press fit on a press for 20 min to 45 min.

5. The method for preparing the composite material according to claim 1, wherein the top coating layer comprises a first-pass elastic top coating and a second-pass top coating, wherein the first-pass elastic top coating comprising, in parts by weight, 10 to 60 parts of bifunctional polyurethane acrylic resins (A), 2 to 7 parts of initiators (A), 10 to 60 parts of acrylate monomers (A) and 3 to 40 parts of additives (A).

6. The method for preparing the composite material according to claim 5, wherein the second-pass top coating comprises, in parts by weight, 2 to 30 parts of acrylic modified organic silicone resins, 0.3 to 3 parts of micropowder particles, 2 to 20 parts of bifunctional polyurethane acrylic resins (B), 10 to 40 parts of polyfunctional polyurethane acrylic resins, 15 to 45 parts of acrylate monomers (B), 2 to 7 parts of initiators (B) and 3 to 40 parts of additives (B).

7. The method for preparing the composite material according to claim 6, wherein preparation raw materials of the acrylic modified organic silicone resins comprise hydroxypolysiloxane, isocyanate (B), a monohydroxy acrylate monomer (B) and a same coupling agent.

8. The method for preparing the composite material according to claim 6, wherein preparation raw materials of the polyfunctional polyurethane acrylic resins comprise polyisocyanate and a hydroxyl-containing acrylate monomer (A).

* * * * *